United States Patent [19]
Schofield et al.

[11] Patent Number: 6,086,112
[45] Date of Patent: Jul. 11, 2000

[54] FLUID SWIVEL COUPLING DEVICE

[75] Inventors: Alan P. Schofield, Fullerton; John W. Kosty, Fountain Valley; Jon Maynard Lenhert, Brea, all of Calif.

[73] Assignee: Saint-Gobain Performance Plastic Corporation, Wayne, N.J.

[21] Appl. No.: 09/229,197

[22] Filed: Jan. 13, 1999

Related U.S. Application Data

[60] Provisional application No. 60/071,476, Jan. 13, 1998.

[51] Int. Cl.[7] ..................................................... F16L 27/08
[52] U.S. Cl. .......................... 285/98; 285/190; 285/276; 285/423
[58] Field of Search ........................... 285/98, 272, 276, 285/423, 190

[56] References Cited

U.S. PATENT DOCUMENTS

| | | | |
|---|---|---|---|
| 2,833,568 | 5/1958 | Corsette | 285/281 |
| 3,679,235 | 7/1972 | Faccou | 285/14 |
| 4,355,827 | 10/1982 | Ehret | 285/98 |
| 4,783,100 | 11/1988 | Klein | 285/276 |
| 5,040,729 | 8/1991 | Carrozza | 239/201 |
| 5,316,351 | 5/1994 | Czimny et al. | 285/276 |
| 5,538,296 | 7/1996 | Horton | 285/276 |

*Primary Examiner*—Eric K. Nicholson
*Attorney, Agent, or Firm*—Christie, Parker & Hale, LLP

[57] ABSTRACT

A fluid swivel coupling device for rotatably interconnecting a pair of fluid conduits. The coupling device includes a plastic swivel housing forming an internal cavity and a fluidly connected first port. The internal cavity includes a cylindrical inner surface having an annular housing retention groove and a spaced apart annular seal groove. A plastic tubular second swivel body portion extends between an internal end and a second port. The internal end is rotatably seated within the internal cavity and includes an annular retention groove opposing the housing retention groove and an annular seal groove opposing the seal groove within the housing. The second swivel body portion is fluidly connected with the first port to define an all plastic fluid passageway between the first and second ports. An annular seal is seated within the internal cavity between the opposing seal grooves for preventing fluid from leaking out of the cavity. A retention bearing is seated within the internal cavity between the opposing retention grooves and adapted to allow rotation of the second body portion while securing the second body portion within the cavity.

17 Claims, 10 Drawing Sheets

FLUID SWIVEL COUPLING DEVICE

CROSS REFERENCES TO RELATED APPLICATIONS

This application claims the benefit of U.S. Provisional Application No. 60/071,476, filed Jan. 13, 1998.

FIELD OF THE INVENTION

This invention relates generally to fluid swivel couplings for the passage of fluids and more particularly, to a fluid swivel coupling device having an all polymer fluid flow path.

BACKGROUND OF THE INVENTION

Rotary and swivel couplers are frequently utilized to connect fluid conduits together. These rotating devices are especially useful when connecting a fluid conduit to a rotating or pivoting device. The swivel coupling, which may rotate about the axis of the input fluid conduit or alternatively, may rotate about a perpendicular axis, is especially useful where maneuverability is essential to the satisfactory operation of the device.

Typically, these swivel couplings consist of a swivel body having an internal cavity. An internal fluid passageway interconnects the cavity with a port which is adapted for interconnection with a fluid conduit. A tubular rotating member is engaged within the cavity. A second fluid passageway, which passes through the rotating member, interconnects the first fluid passageway and a second port for connection with a second fluid conduit. A bearing is disposed between the rotating member and the cavity to allow for the rotation of the rotating member. The assembly may include a seal to prevent passage of fluid from between the rotating member and the cavity and means for preventing the axial movement of the rotating member from within the cavity.

While prior art swivel couplings are quite satisfactory in most instances, they have several disadvantages. For example, prior art swivel couplings are typically made from metal components. While metal components provide a coupling with high strength, relatively wear-resistant components and the ability to retain high pressures while maintaining tight tolerances, metal components can be a source of chemical contamination. This contamination can be through ionic, catalytic, or through direct chemical reaction. Metal can also conduct electricity and electrical discharge and when placed in contact with the flow, can contaminate certain fluids.

Recent technological advances have increased the need for fluid swivel coupling devices that provide free rotation without the use of metal components which could contaminate the fluid. For example, in the semiconductor industry, rotary tables are commonly used for lapping or cleaning semi-conductor wafers. A fluid swivel coupling facilitates the fluid conduit feed into the rotary table. However, because metal components in the fluid flow path can potentially contaminate the passing fluid, there is a need for a fluid swivel coupling device which has no metal components along the fluid flow path.

Modern swivel coupling applications, including delivering fluids for lapping semiconductor wafers, often require the passage of abrasive fluids and slurries. These abrasive fluids can significantly wear against seals and tightly toleranced interfacing parts along the flow path. Typically, metal components are used to resist this wear. However, the use of metallic components along the flow path may not be an option clue to concerns regarding fluid contamination and corrosion. Thus, there is a need for a fluid swivel coupling device which does not use metal components along the flow path and which is capable of resisting wear due to the passage of abrasive fluids.

SUMMARY

The present invention overcomes the aforementioned problems by providing a fluid swivel coupling device having a fluid flow path made from wear-resistant and fluid compatible polymers. The use of such wear-resistant and fluid compatible polymers along the entire flow path, including the seal junction and any other exposed surfaces, eliminates any potentially contaminating metal or elastomer components which might otherwise contact the fluid. By using high-grade plastics, the fluid swivel coupling device is manufacturable to high tolerances and capable of sustaining relatively high pressures. In addition, the plastic may be selected to be non-contaminating and specifically compatible relative to each specific application.

The present invention is generally directed to a fluid swivel coupling device for rotatably interconnecting a first fluid conduit and a second fluid conduit. The fluid swivel coupling device includes a swivel housing or first body portion which forms an internal cavity. A first fluid passageway within the housing extends along a first axis and interconnects the internal cavity with a first port. The first port is adapted for connection with one of the fluid conduits. The internal cavity defines an inner surface which is adapted to rotatably support a second swivel body portion.

The second swivel body portion is a tubular member which defines a second fluid passageway that extends between an internal end and an external or second port. The internal end is generally configured as a spigot end and adapted for rotatable seating within the internal cavity. In addition, the internal end is fluidly connected with the first passageway within the housing. The second port is adapted for fluid connection with the remaining fluid conduit.

An annular seal is disposed within the internal cavity of the first body portion. The seal is adapted to seal against the internal cavity as well as slidably contact against the external surface of the second swivel body portion and prevent fluid from leaking therebetween and thus, out of the housing.

The entire fluid contact surface of the swivel connector assembly of the present invention is constructed from a non-metal material. Thus, each of the first internal passageway and the second internal passageway is made from a non-metal material. In addition, the fluid contact surface of the seal is also constructed from a non-metal material.

In another aspect of the present invention, the internal cavity of the housing body portion includes an annular housing retention groove and a spaced apart annular seal groove. In addition, a bearing passageway extends from the internal annular retention groove to an outer surface on the housing body. This passageway allows access from outside the housing to the retention groove.

The internal end of the second swivel body portion includes a second annular retention groove which is aligned to oppose the first or housing retention groove when seating. The opposing grooves form an annulus therebetween for supporting a retention bearing.

The retention bearing is disposed within the annulus created between the opposing retention grooves. The retention bearing is insertable through the bearing passageway to facilitate assembly of the second body portion within the housing. The retention bearing allows rotation of the second swivel body portion while securing the second body portion within the internal cavity of the housing. A plug is inserted into the bearing passageway to maintain the retention bearing within the retention grooves and to prevent entry of contaminants.

In yet another aspect of the present invention, a radial lip seal is seated within the annular seal groove of the housing and slidably contacts an outer surface of the rotatable second body portion to prevent fluid from leaking out of the housing. The annular lip seal includes an annular jacket having an internal groove cavity and an annular energizer.

This invention, together with the additional features and advantages thereof, which is only summarized in the foregoing passages, will become more apparent to those of skill in the art upon reading the description of the preferred embodiments, which follows in the specification taken together with the drawings.

BRIEF DESCRIPTION OF THE DRAWINGS

FIG. 4a is a sectional view of the housing shown in FIG. 3a;

FIG. 4b is a partial sectional view taken along lines b—b of FIG. 4a;

FIG. 4c is an enlarged partial view taken along lines c—c of FIG. 4a;

FIG. 5b is an end view of the second body portion of FIG. 5a;

FIG. 8a is a partial sectional view of the fluid swivel coupling device taken along lines 8—8 of FIG. 2 showing a cord retention bearing and a bearing plug;

FIG. 9b is a bottom view of the bearing plug of FIG. 9a;

DESCRIPTION OF THE PREFERRED EMBODIMENTS

Figures 1, 3A:
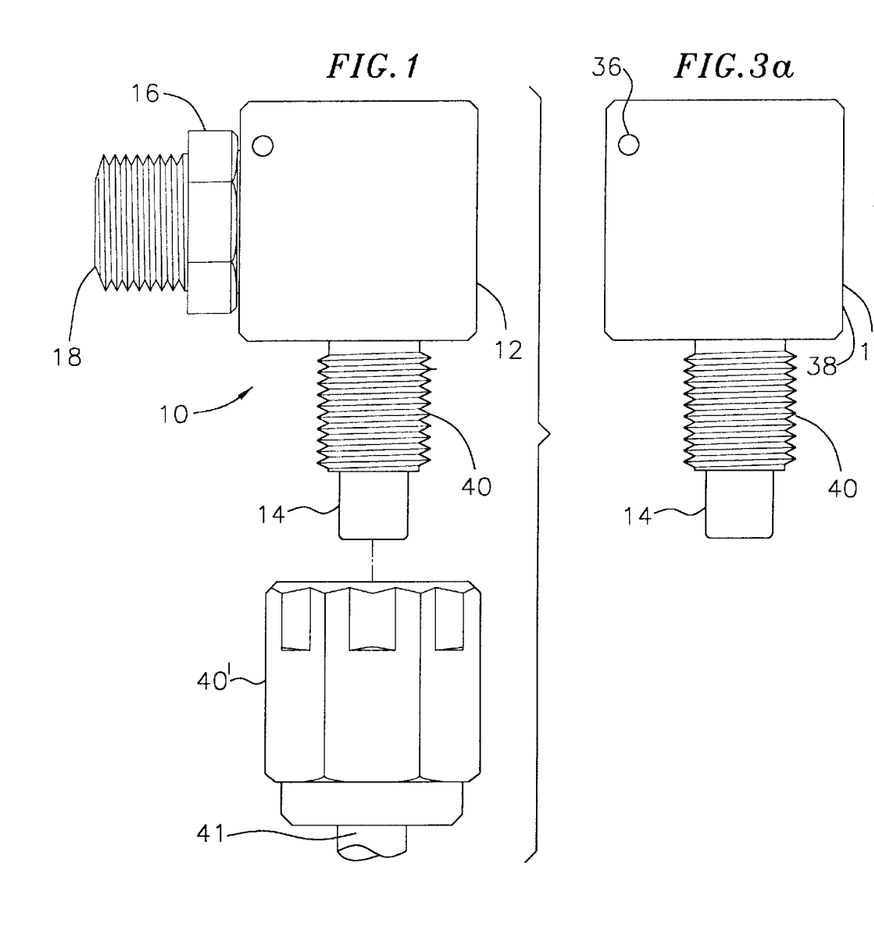
FIG. 1 is a side elevational view of an embodiment of the fluid swivel coupling device of the present invention.
FIG. 3a is a side elevational view of the housing of FIG. 1.

Referring now to the drawings, wherein like reference numerals designate identical or corresponding parts throughout the several views and embodiments, a fluid swivel coupling device is illustrated in FIG. 1 and designated by reference numeral 10. As shown, the fluid swivel coupling device or simply coupling device 10 includes a swivel housing or first body portion 12 having a first port 14. The housing 12 is adapted to rotatably support a second swivel body portion 16 having an corresponding second port 18 in fluid communication with the first port 14. The second swivel body portion 16 is rotatably and sealably maintained within the housing 12 as will be described in greater detail below.

Figure 2:
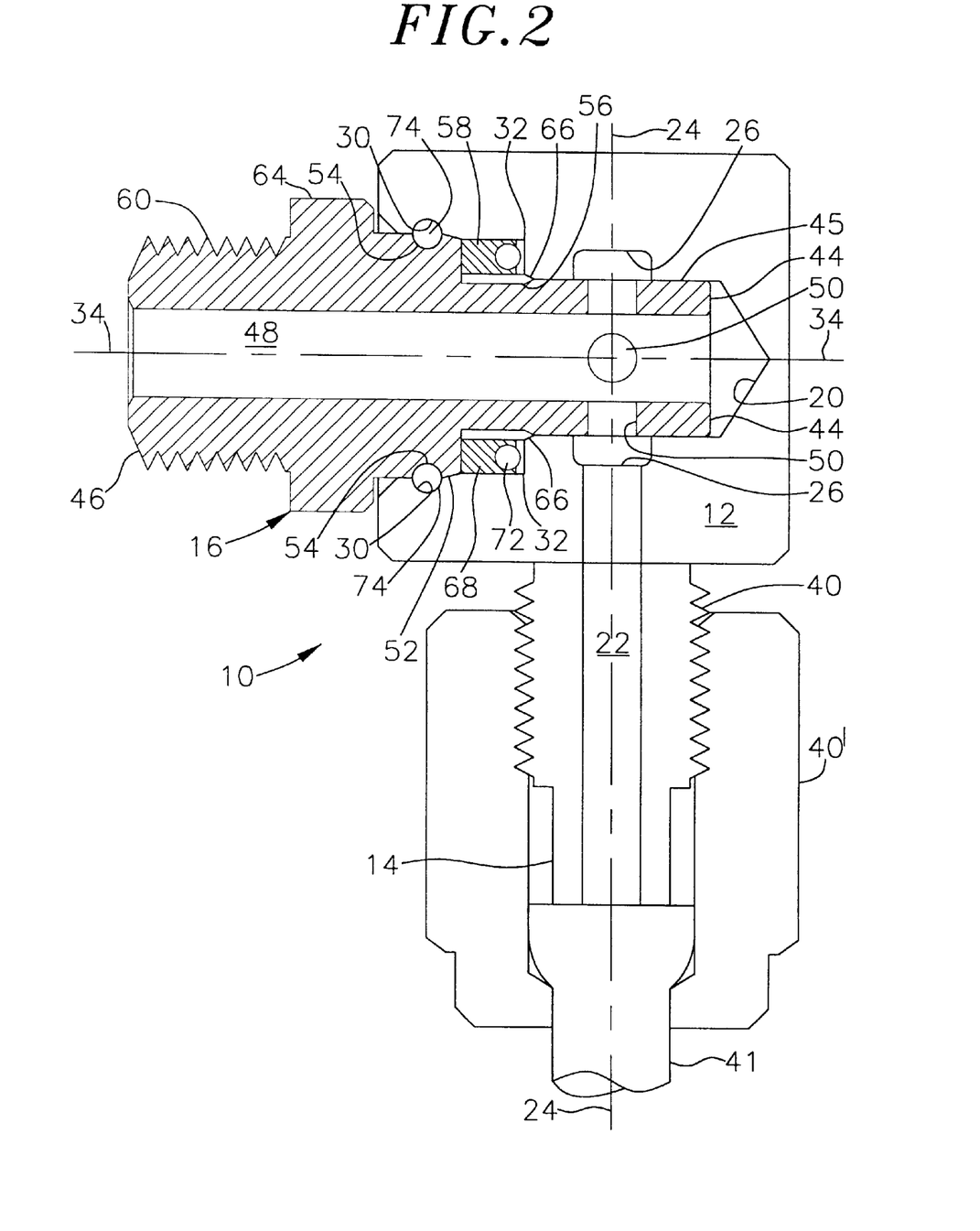
FIG. 2 is a sectional view of the fluid swivel coupler of FIG. 1.
Figure 3B:
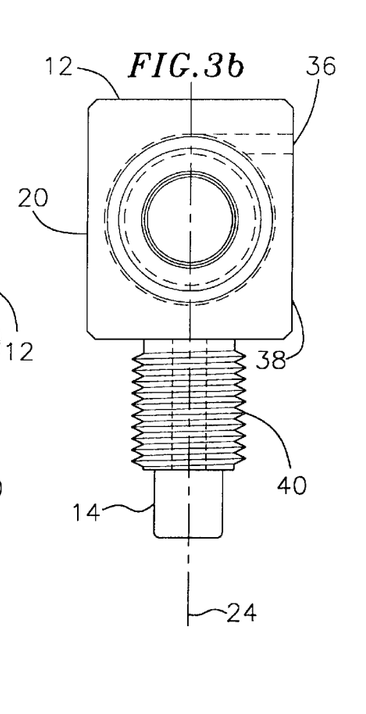
FIG. 3b is a side view of the housing of FIG. 3a shown rotated 90°.
Figure 4A:
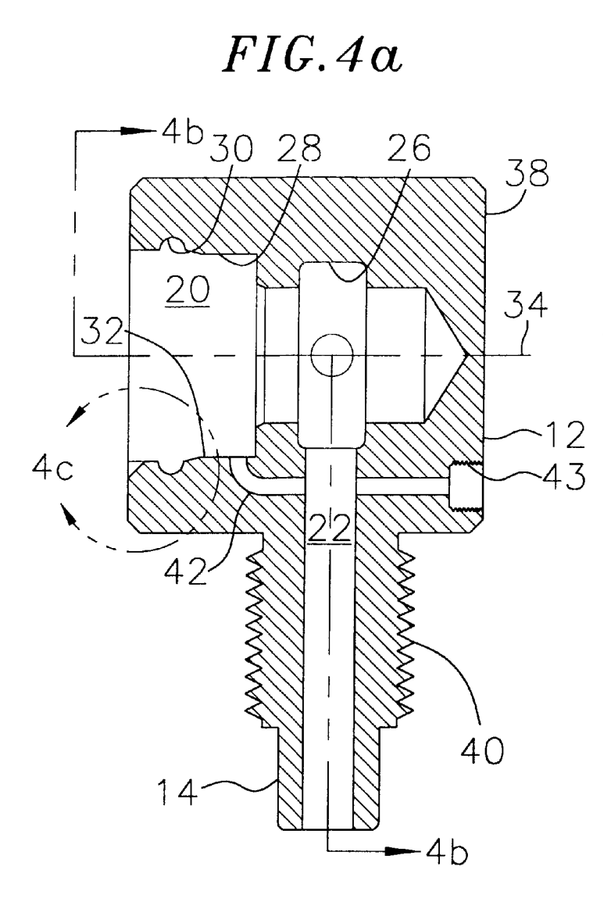
Figure 4B:
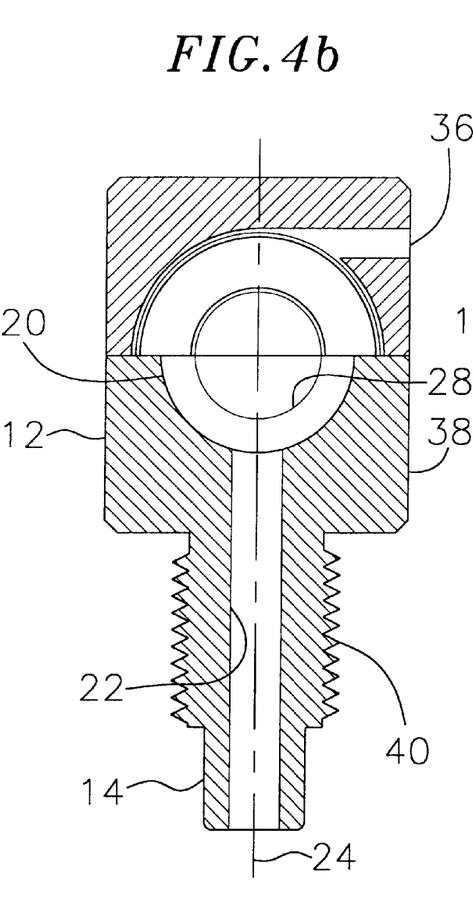
Figure 4C:
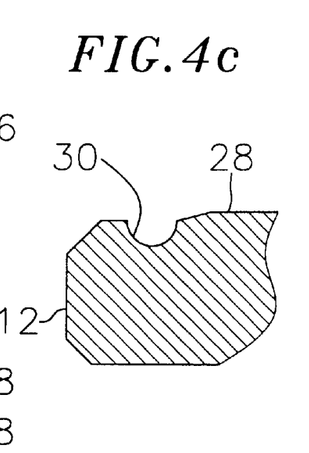

Referring now to FIGS. 2 through 4, the swivel housing 12 forms an internal cavity 20 which is fluidly connected to the first port 14 through an internal passageway 22. Preferably, the first port 14 and the passageway 22 are aligned along a first axis 24. The internal cavity 20 may include an inlet slot or groove 26 at the end of the passageway 22 adjacent the cavity 20. Because, the first part 14 is preferably an inlet port, the inlet groove 26 facilitates the transition of the flow from the first passageway 22 into the cavity 20. Preferably, this inlet groove 26 is circumferential around the diameter defining an inner surface 28 of the cavity.

In the embodiment illustrated, the internal cavity 20 includes an annular housing retention surface or groove 30 and a spaced apart annular housing seal surface or groove 32, each of which is circumferential about the cavity inner surface 28. As shown, the annular seal groove 32 is disposed between the retention groove 30 and the inlet passageway 22 however, this configuration may not be required as will be described further below. Preferably the housing retention groove 30 is spaced apart and generally aligned parallel to the annular housing seal groove 32. In addition, both circumferential grooves 30 and 32 are aligned substantially perpendicular to a second axis 34 which is concentric with the cavity 20.

Figure 14:
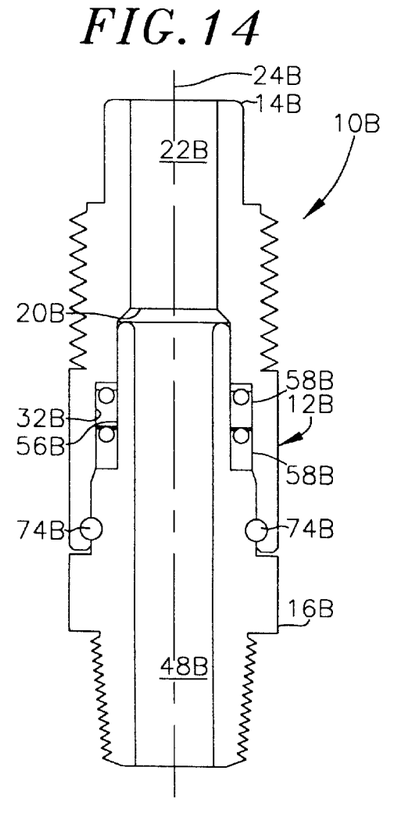
FIG. 14 is a sectional view of another alternative embodiment of a fluid swivel coupling device constructed according to the principles of the present invention.
Figure 15:
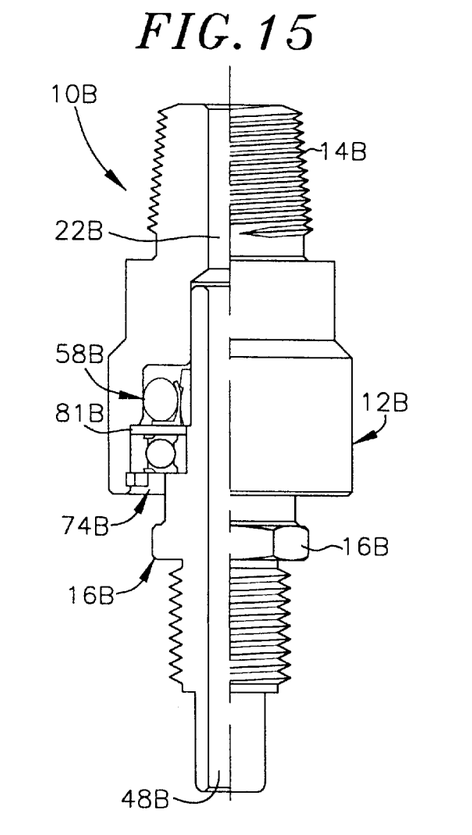
FIG. 15 is a partial front, partial sectional view of another alternative embodiment of a fluid swivel coupling device constructed according to the principles of the present invention.

As illustrated, the internal first passageway 22 is substantially perpendicular to the cavity 20. This configuration provides a 90 degree change in flow direction along the flow path and defines a perpendicular or 90 degree coupler. However, other flow path configurations may also be used. For example, the fluid swivel coupling device 10 may be a straight coupler wherein the inlet passageway 22 is aligned parallel with the cavity 20 to form a straight fluid flow path. In the straight coupler configuration, and as best illustrated in FIGS. 14 and 15 the first axis 24 is parallel and substantially contiguous with the second axis 34. In other embodiments, the first passageway 22 may also be oriented at various angles relative to the cavity 20 and may also include curved flow paths.

Referring now back to FIGS. 2 through 4, the housing retention groove 30 is a specific surface for supporting a bearing. In the illustrated embodiment, the groove 30 is generally semi circular in cross-sectional shape and acts as a bearing race. A bearing passageway 36 interconnects the housing retention groove 30 to an outer surface 38 of the housing 12 as best illustrated in FIGS. 3a, 3b and 4b. Preferably, the bearing passageway 36 is cylindrical in cross-section and has a radius substantially similar or slightly larger than the radius of the housing retention groove 30.

A first means of coupling 40 is provided along the first port 14. The coupling means 40 is used to connect a first fluid conduit 41 to the housing 12 as best illustrated in FIG. 2. Preferably, the first fluid conduit 41 is provided with a conduit coupling means 40' which is compatible with the first coupling means 40. In the exemplary embodiment, the inlet coupling means 40 is a threaded portion along the first port used in conjunction with a similarly threaded cap and tubing connection 40'. Alternatively, other means of interconnecting the first fluid conduit 41 to the first port 14 may be used. These alternative inlet coupling means 40 may include a commonly used flared tubing configuration, a pipe thread configuration, a straight thread configuration with a sealing ring, or any other device or configuration as will be known to those of skill in the art.

As is best illustrated in FIG. 4a, a second fluid passageway 42 within the housing 12 may optionally be provided to allow a second fluid into the internal cavity 20, proximally adjacent the annular seal surface 32. The second fluid passageway 42 is configured for connection with a source of clean fluid which is allowed to pass into the cavity 20 at a location between the annular seal 58 and the inlet groove 26. The second clean fluid application is used with abrasive fluid application where the second fluid displaces the more abrasive first fluid being transferred through the inlet passageway 22 and thus, minimizes the wear on the annular seal 58. The second fluid passageway 42 is an optional design feature within the housing 12 and may be omitted. However, in slurry and other abrasive fluid applications which are particularly wearing to the dynamic surfaces of the coupling device 10, the second fluid passageway 42 may be particularly advantageous.

In the exemplary embodiment, the second fluid passageway 42 allows the clean fluid, which may be water, to pass from a second inlet 43 in the housing 12 into the internal cavity 20. Preferably, the clean fluid is provided from a source which is connected to the threaded or similarly configured second inlet 43 as will be known to those of skill in the art. In an alternative embodiment, the second fluid passageway 42 may extend between the inlet passageway 22 and the cavity 20. In this configuration, the second fluid passageway 42 is tapped into the inlet passageway 22 and restricted in diameter to meter the quantity of fluid passing. The reduced diameter of the second fluid passageway 42 only allows the base liquid of the slurry to pass. More specifically, the smaller diameter second inlet passageway 42 may have a diameter less than the average diameter of the abrasive particles within the slurry or other abrasive fluid being transferred through the coupling 10.

The second fluid passageway 42 passes the less abrasive fluid into the cavity 20 just proximally of the annular seal groove 32. This floods the cavity 20 between the annular seal 32 and the inlet groove 26 with a clean or base liquid and displaces the more abrasive fluid being transferred. The less abrasive fluid may be less detrimental and wearing than the abrasive fluid being passed, allowing a longer life for the fluid swivel coupling device 10. A filter may be used to restrict the passage of abrasive particles and a flow control valve or similar device may be used to meter the fluid, as will be known to those of skill in the art.

All of the fluid passageways and fluid contact surfaces 16, 20, 22, and 42 are made from a plastic which is inert to the passing fluid. This advantageously prevents contamination and corrosion problems associated with metallic fluid paths. In addition, a particular plastic may be selected for each specific application. The non-metal fluid flow path of the present invention is particularly advantageous with applications in the manufacture of computer chips. These applications can be particularly sensitive to ionic contamination of fluids through contact with metals. Materials other than plastics may also be used such as ceramics and in particular, non-plastic parts may be used where they do not contact the passing fluid.

In the exemplary embodiment, the housing 12 is made from an integral piece of engineering thermoplastic. Suitable plastics include virgin polyetheretherketone (PEEK); a lubricated PEEK, such as a PEEK lubricated with about 20% PTFE (a polytetrafluoroethylene, such as TEFLON); as well as semi-crystalline polyesters (PET-P), such as ERTALYTE, which is supplied by Polymer Corporation of Reading, Pa. The housing 12 can be formed from a single block of the plastic and machined to have the described configuration or it can be injection molded when an injection molding grade plastic is used.

Figure 5A:
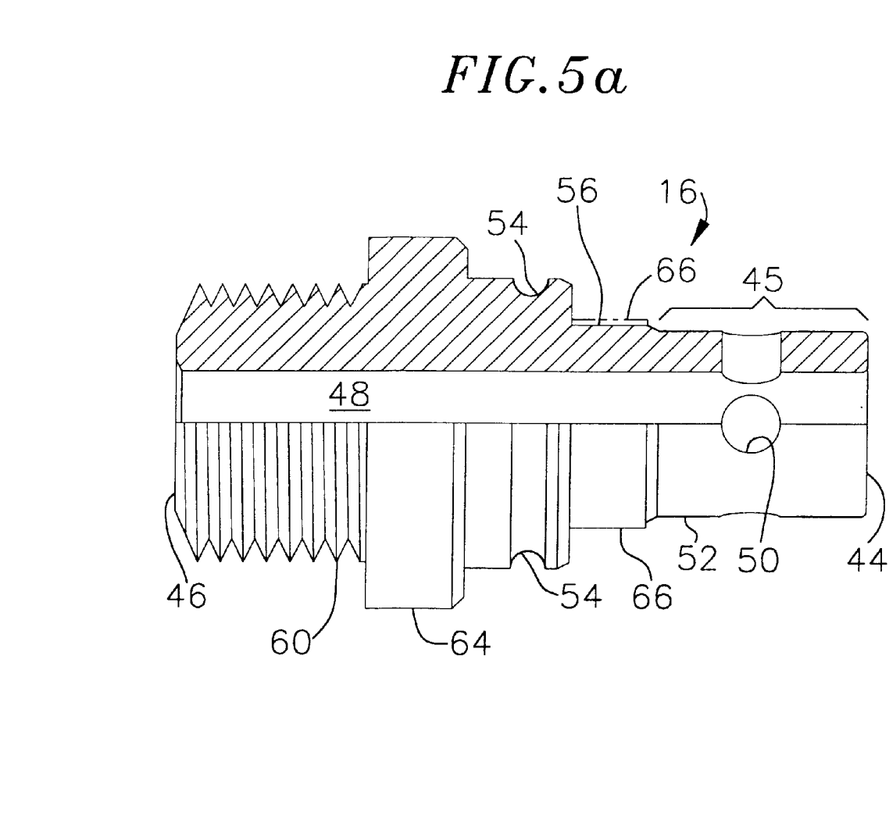
FIG. 5a is a partial cut-away side view of an embodiment of a second swivel body portion constructed according to the principle of the present invention.
Figure 5B:
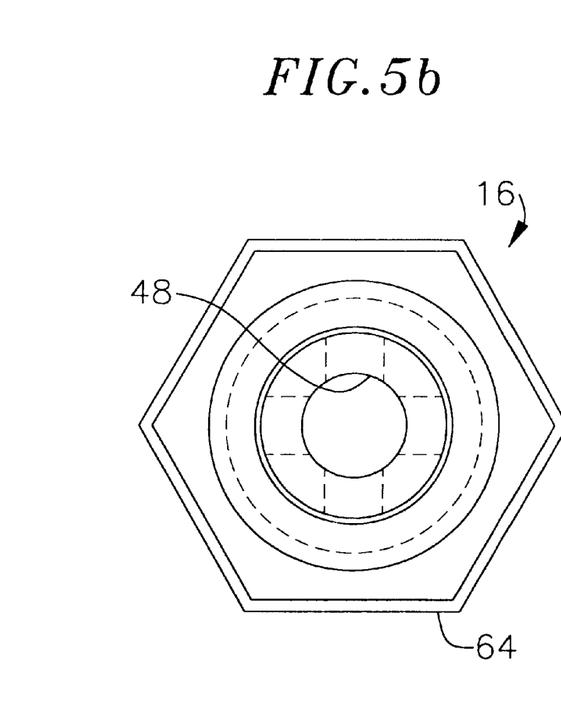

Referring now to FIGS. 5a and 5b in conjunction with FIG. 2, the second swivel body portion 16 extends between an internal end 44 and a second port 46 and defines a second passageway 48 therebetween. The internal end 44 may have an outer diameter substantially conforming to the inner diameter of the circular inner surface 28 of the cavity 20. This allows the internal end 44 to be rotatably seated within the cavity 20. Preferably, the distal end 44 of the second swivel body portion 16 is configured to form a spigot portion 45 which extends across the inlet groove 26 of the housing 12. The spigot portion 45 acts as a bearing surface against the inner surface 28 of the cavity 20 along either side of the inlet groove 26. As previously noted, the spigot end 44 is preferably an inlet to the second passageway 48.

A hole or plurality of radially drilled holes 50 pass through the spigot portion 45 of the second swivel body portion 16 and fluidly connect the second passageway 48 with the first passageway 22. Preferably, the holes 50 are aligned within the inlet groove 26 of the housing 12. This configuration advantageously allows fluid to flow directly between the first passageway 22 and the second passageway 48. Preferably, the flow is directed from the first port 14 to the second port 18.

To reduce pressure drop or head losses, the holes 50 are preferably sized to have a combined flow area of at least the cross-sectional or flow area of the first or inlet passageway 22. In addition, the annular flow area between the outer surface of the second swivel body portion 16 and the surface of the inlet groove 26 is preferably at least equal to the flow area of the inlet passageway 22. This annular flow area is defined as cross sectional area of the flow around each side of the spigot 45 within the inlet groove 26 and as illustrated in FIG. 2.

The inlet passageway 22 and the second or outlet passageway 48 may have substantially similar inner diameters or flow areas. Providing a coupling device 10 having the inlet and outlet passageways 22 and 48 with substantially equivalent flow areas advantageously allows fluid flow having similar head losses and flow characteristics in either the conventional direction as presently described or in a reverse direction. Alternatively, the inlet passageway 22 and the outlet passageway 48 may have different inner diameters or flow areas.

As best illustrated in FIG. 2, the internal end 45 of the second swivel body portion 16 includes an annular retention surface or groove 54. The annular retention groove 54 is aligned to oppose the housing retention groove 30. More specifically, in the illustrated embodiment, the annular retention groove 54 comprises a semi-circular cross-section which is aligned opposing the housing retention groove 30 which also has a semi-circular cross-section. The opposing semi-circular retention grooves 54 and 30 define an annular slot having a generally circular cross-section. Preferably, each of the annular retention groove 54 and the housing retention groove 30 are configured as bearing surfaces or races. However, and as will be discussed further, the opposing retention grooves 30 and 54 may also be flat or other surfaced regions for supporting a separate bearing.

An annular seal surface 56 is preferably formed about the circumference of the second swivel body portion 16 and configured for slidable contact against an annular seal 58. Preferably, the annular seal surface 56 is disposed between the inlet holes 50 and the annular retention groove 54 and directly opposing the annular seal surface or groove 32 formed within the housing 12. The annular seal 58 prevents fluid from passing between the exterior of the second swivel body portion 16 and the inner surface 28 of the cavity 20 and from reaching the retention grooves 54 and 30, as well as from leaking out of the cavity 20.

The second port 46 on the end of the second swivel body portion 16 includes a means for coupling 60 with a second fluid conduit such as a tubing or pipe (not shown). The second coupling means 60 may include any device or mechanism for connection with the second fluid conduit such as that described for the inlet connector means 40. In the embodiment illustrated, the second coupling means 60 is a pipe fitting. Thus, the second fluid conduit would interconnect with the second port 18 using a connector having mating pipe threads. Gripping surfaces 64, such as wrench surfaces, may be provided to facilitate this coupling.

The passageway 48 through the second body portion 16 comprises a plastic material. Preferably, the entire second swivel body portion 16 is made from a plastic, such as the plastics described for the housing 12. The second swivel body portion 16 can be machined to the desired tubular configuration from a block of plastic or be injection molded when an injection molding grade plastic is used. Other methods and devices for forming the housing 12 and the second swivel body portion 16 may also be used, such as a combination of extruding, molding and machining and as will be known to those of skill in the art.

An optional wear sleeve 66 is disposed around the outer circumference of the second swivel body portion 16. The wear sleeve 66 is adapted to sealably fit around the internal end 45 of the second body portion 16 and provide a frictionless surface for contact against the annular seal 58. Preferably, the wear sleeve 66 is disposed about the annular seal surface 56 formed on the second swivel body portion 16 and may even form this seal surface. The wear sleeve 66 is adapted to provide a wear-resistant surface against the annular seal 58 and prolong the life of the coupling device 10.

Preferably, the wear sleeve 66 comprises a thin sleeve having a surface hardness greater than that of the second swivel body portion 16. The wear sleeve may be made from hard plastic, an aluminum oxide, sapphire, ruby or zirconia or other suitable wear surface. Preferably, the wear sleeve 66 is pressed onto the second body portion 16. The incorporation of a wear sleeve is particularly advantageous when harsh and abrasive fluids such as lapping slurry are being passed through the coupler 10.

Figure 6:
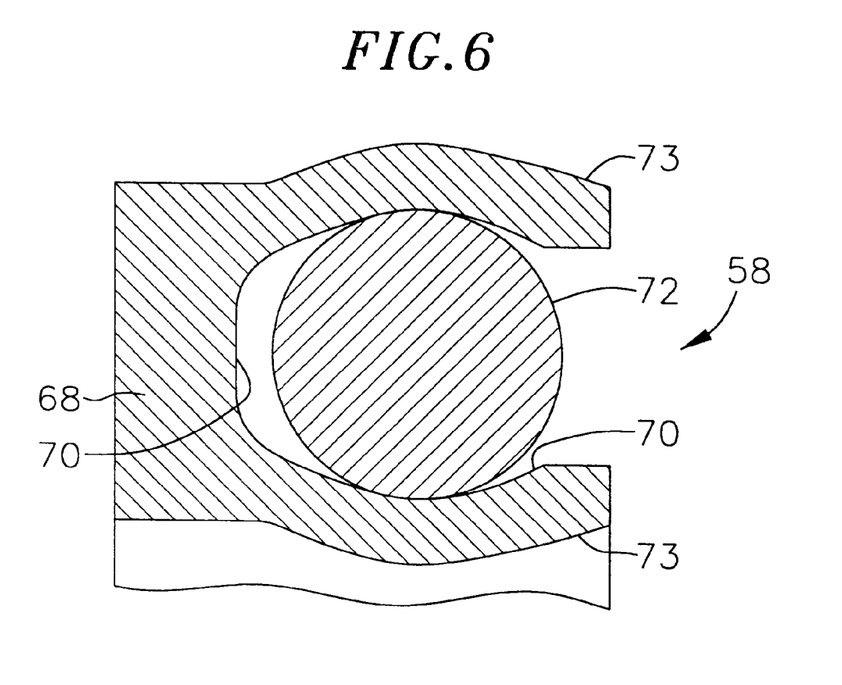
FIG. 6 is a sectional view of an embodiment of an annular seal constructed according to the principles of the present invention.
Figure 7:
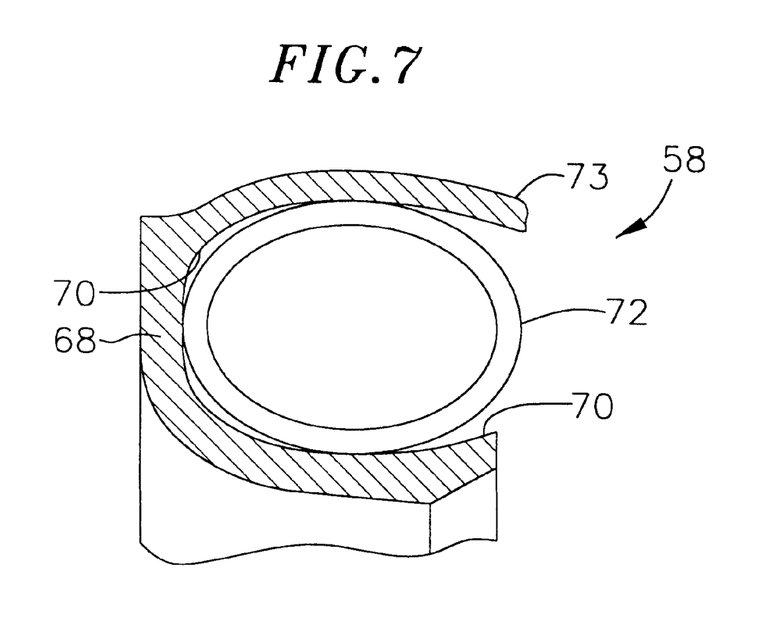
FIG. 7 is a sectional view of an alternative embodiment of an annular seal according to the principles of the present invention.

Referring now to FIGS. 6 and 7 in conjunction with FIG. 2, the annular seal 58 may be disposed between the opposing annular seal groove 32 and the seal surface 56. The annular seal 58 is preferably sealably fit against the inner surface 28 of the cavity 20 and slidably seals against the circumference of the second swivel body portion 16. The seal 58 prevents the passage of the transmitted fluid into the bearing 74 and also out of the cavity 20 from between the second body portion 16 and the cavity.

Figure 10:
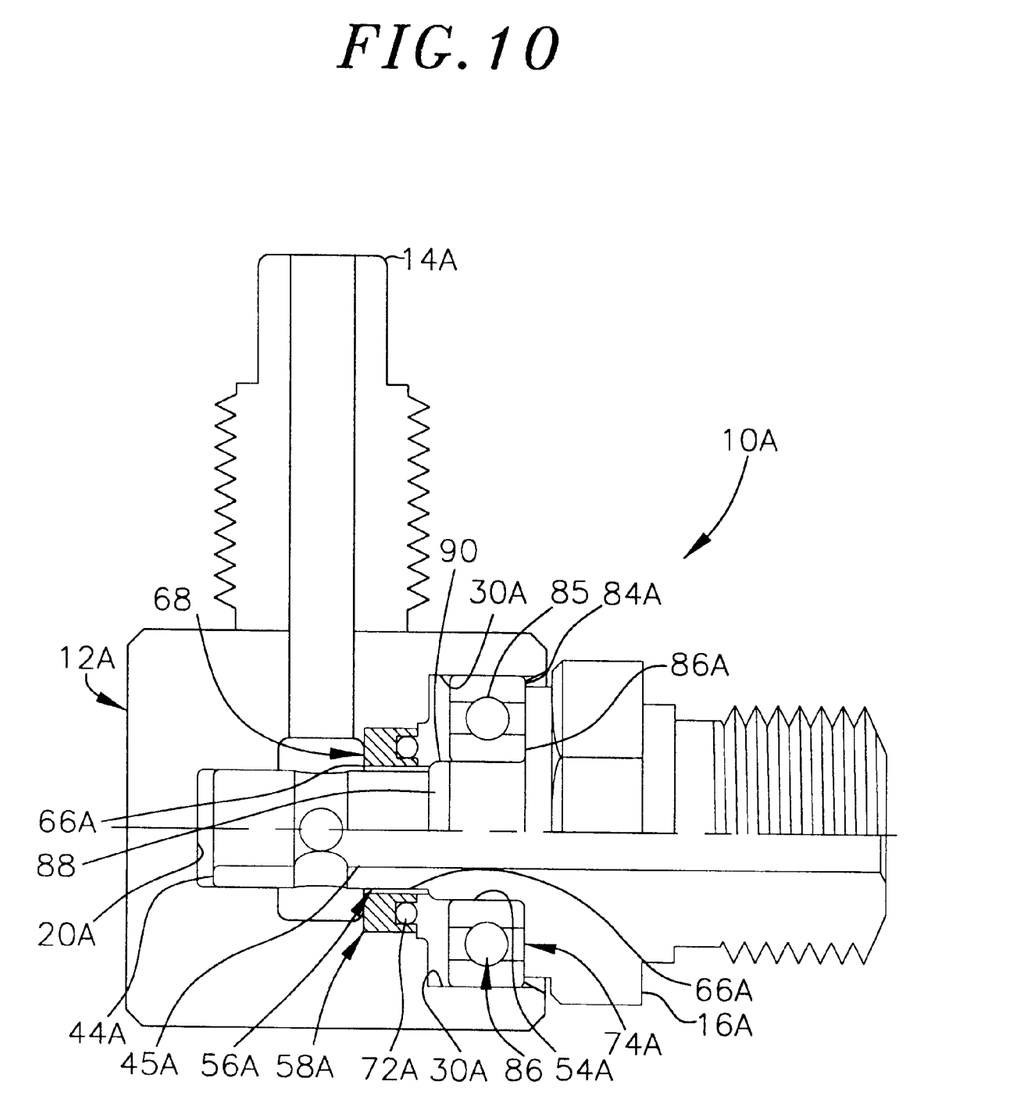
FIG. 10 is a sectional view of an alternative embodiment of a fluid swivel coupling device constructed according to the principles of the present invention.
Figure 11:
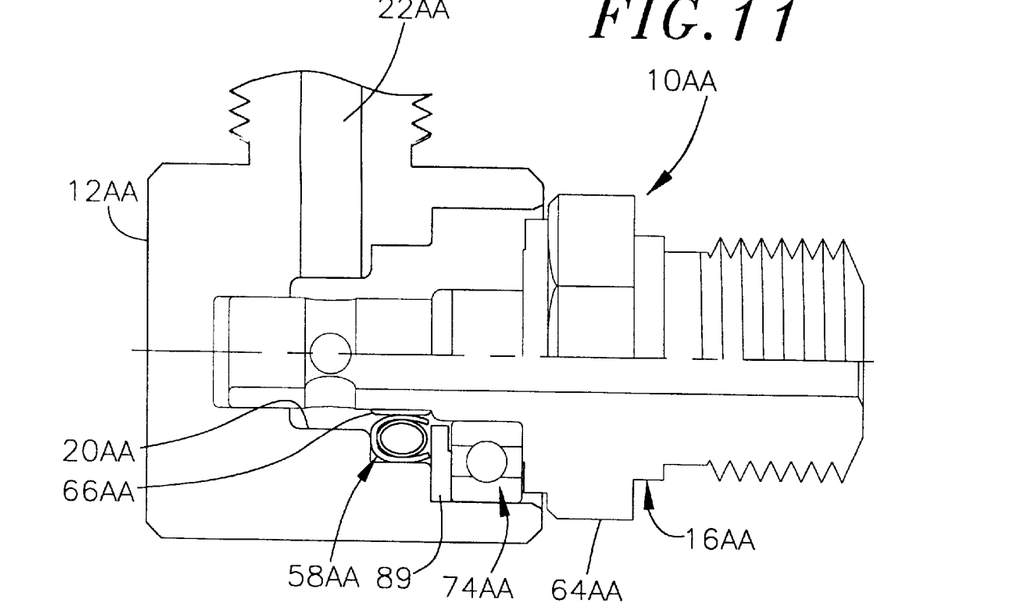
FIG. 11 is partial front, partial sectional view of another alternative embodiment of a fluid swivel coupling device constructed according to the principles of the present invention and showing a spacer between the seal and bearing.

The annular seal 58 may include a polymer jacket 68 having an interior seal groove cavity 70 for supporting an energizer 72. The annular seal 58 may be installed with the energizer 72 facing towards the fluid pressure for high pressure applications and where contamination or exposure of the energizer to the fluid are not critical and as best illustrated in FIG. 2. For lower pressure, such as below approximately 60 psi, highly corrosive or high purity applications, the annular seal 58 may be installed with the energizer 72 facing out of the cavity 20 and towards the annular retention bearing 74 as best illustrated in FIGS. 10 and 11.

The energizer 72 is supported within the internal groove cavity 70 and acts to expand an outer surface 73 of the jacket 68 against the second swivel body portion 16 and the cavity 20. The energizer 72 may include a solid core, plastic ring or 0-ring, as best illustrated in FIG. 6. Alternatively, the energizer 72 may include a spring or other similar device, as best illustrated in FIG. 7.

The jacket 68 may be made from any suitable dynamic seal plastic, such as virgin PTFE, PTFE blends, ultra high molecular weight polyethylenes (UHMW), and UHMW blends. The energizer 72 may be made from any suitable elastomer or thermoplastic elastomer. When exposed to the passing fluid, such as a deionized water, the energizer is preferably an 0-ring constructed from a perflouroelastomer such as KALREZ from Dupont Company.

Alternatively, the energizer 72 may comprise a metal, such as a metal spring. Metal may be advantageous due to its inherent strength and spring capabilities and may be particularly applicable in low pressure applications. When using a metal energizer 72, the jacket 68 is preferably rotated 180 degrees such that the metal energizer 72 faces outward relative to the cavity 20 and away from contact with the fluid, as best illustrated in FIGS. 10 and 11. In this orientation, the metal energizer 72 is downstream from the fluid sealing surface and does not contact the fluid being passed through the swivel coupling device 10.

The annular seal 58 may also be a rotary lip seal made from a plastic material which uses a feature of deforming the outer sealing surface or outer lip 73 of the jacket 68 against the inner surface 28 of the cavity 20, such as a DYNALIP seal from Furon Company and best illustrated in FIG. . Preferably, when a rotary lip seal is used, it is made from a plastic or elastomer material. The plastic material preferably includes a "memory" that ensures the outer lip 73 or outer lips will attempt to return to their original configuration throughout the service life. Typical annular seal materials 58, in addition to the above-described materials, include fluoropolymers, such as PTFE and filled PTFE-type materials as well as ultra high molecular weight polyethylenes and high density polyethylenes.

Figure 8A:
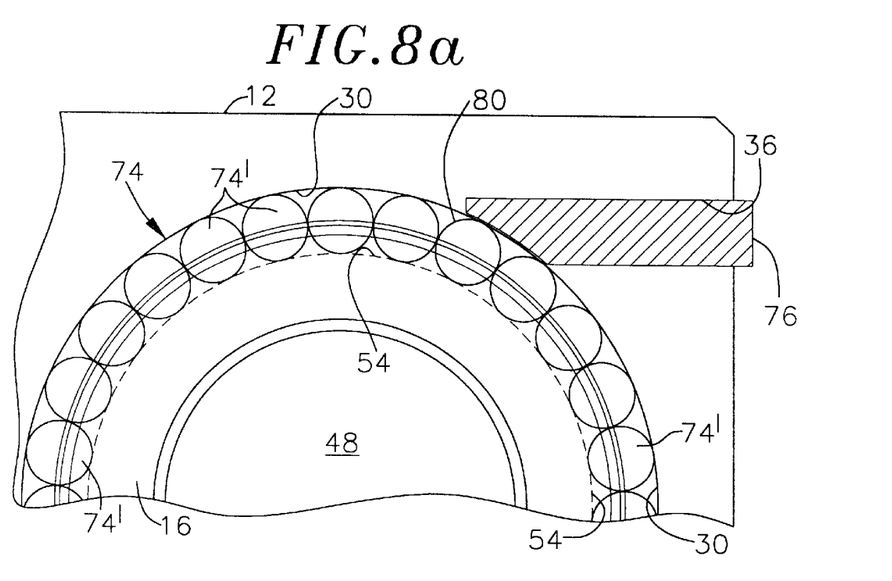
FIG. 8a is a partial sectional view of the fluid swivel coupling device taken along lines 8—8 of FIG. 2 showing a ball retention bearing.
Figure 8B:
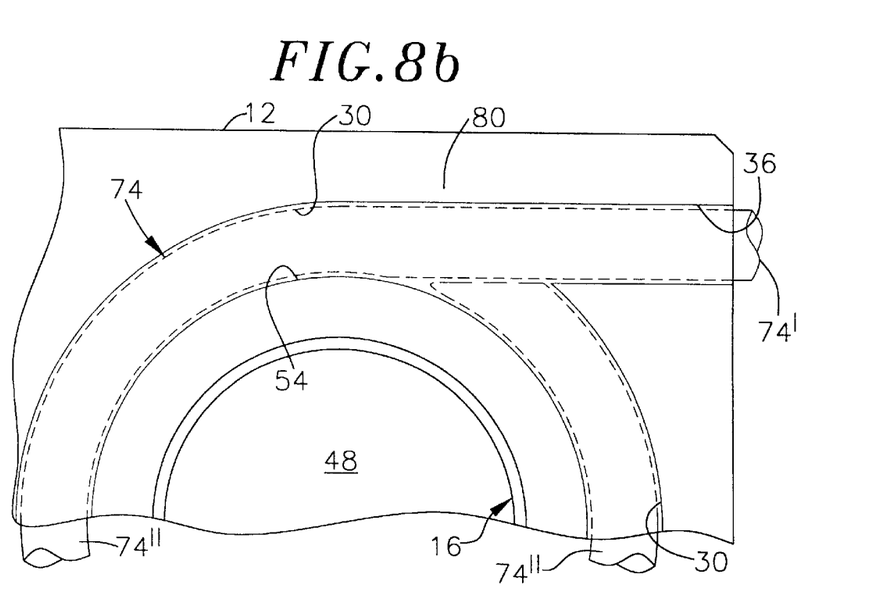

Referring now to FIG. 2 in conjunction with FIGS. 8a and 8b, a retention bearing 74 is disposed between the adapter retention groove 54 and the opposing housing retention groove 30. The retention bearing 74 has a cross-sectional shape compatible with the slot defined by the cross-sectional shapes of the opposing retention grooves 30 and 54. The retention bearing 74 facilitates rotational movement between the annular adapter 16 and the housing 12 while maintaining the adapter secured within the cavity 20.

The retention bearing 74 is also configured to be passable through the bearing passageway 36. In this way, the second swivel body portion 16 may be fitted with the annular seal 58 and then inserted into the cavity 20 followed by the insertion of the retention bearing 74 through the bearing passageway 36 and into the slot defined between the retention grooves 30 and 54.

Referring now to FIG. 8a, a specific embodiment of the retention bearing 74, designated as 74' will be described. In this embodiment, the retention bearing 74' comprises a plurality of ball bearings. A plug 76 is placed into the bearing passageway 36 to maintain the retention bearing 74 within the retention grooves 30 and 54 while preventing the ingress of contamination. The ball bearings 74' are configured to have a substantially spherical shape with a slightly smaller diameter than the diameter of the slot defined between the retention grooves 30 and 54. This tolerancing facilitates movement of the ball bearings 74' within the retention grooves 30 and 54 while preventing undesirable lateral movement as is known to those of skill in the art.

The ball bearings 74' may comprise stainless steel ball bearings, such as those supplied by Micro-Surface Engineering, Inc. of Los Angeles, Calif. However, the ball bearings 74' may also be made from a hard plastic or ceramic material and have different diameters. Sapphire alternating with PTFE or similar plastic may also be used. The plastic, sapphire or ceramic materials may be advantageous where non-metallic surfaces are desired. Removal of the second swivel body portion 16 from the housing 12 requires removal of the plug 76 from the bearing passageway 36 and subsequent removal of the ball bearings 74'.

Referring now to FIG. 8b, an alternative embodiment of the retention bearing 74, designated as 74" will be described. In this embodiment, the retention bearing 74" comprises a frictionless cord. In this configuration, the relatively flexible plastic cord bearing 74" is inserted through the bearing passageway 36 and allowed to fill the slot formed between the opposing retention grooves 30 and 54. Preferably, the bearing cord 74" has a circular cross-sectional shape with a slightly smaller radar than the radius of each of the retention grooves 30 and 54. In a similar fashion to the ball bearings 74", the cord bearing 74" allows the second swivel body portion 16 to rotate freely relative to the housing 12 while preventing axial movement. Preferably, the cord bearing 74" comprises a relatively frictionless and durable material such as a nylon or other similar plastic.

The use of the cord bearing 74" is advantageous where it is expected that the second swivel body portion 16 may need to be removed from the housing 12. Removal of the ball bearings, as described in the previous configuration, may be time consuming and difficult. Each ball bearing must be worked out of the slot between the retention grooves 30 and 54 and then out of the housing 12 through the bearing passageway 36. In contrast, the cord bearing 74" may be simply removed by at least two different methods. In the first and preferred method, the end of the cord bearing 74" within the bearing passageway 36 is grabbed by a pair of pliers or similar device and pulled out.

In applications where the end of the cord bearing 74" is not exposed or is not possible to grasp, the cord bearing may be heated until it is sufficiently soft to yield, thereby allowing the second swivel body portion 16 to be removed from the housing 12, by pulling it out of the cavity 20 and past the weakened cord bearing. In this configuration, the annular seal 58 must be made from a polymer capable of higher temperatures, such as UHMW polyethylene. Preferably, the cord bearing 74" comprises a plastic having a melting temperature of less than about 400° F. and more preferably, less than about 350° F. The housing 12, the second swivel body portion 16, and the annular seal 58 may then be made from materials which can withstand a temperature of at least about 400° F. without significant softening or permanent damage. This allows the cord bearing 74" to sufficiently soften, facilitating disassembly of the parts without damage.

Figure 9A:
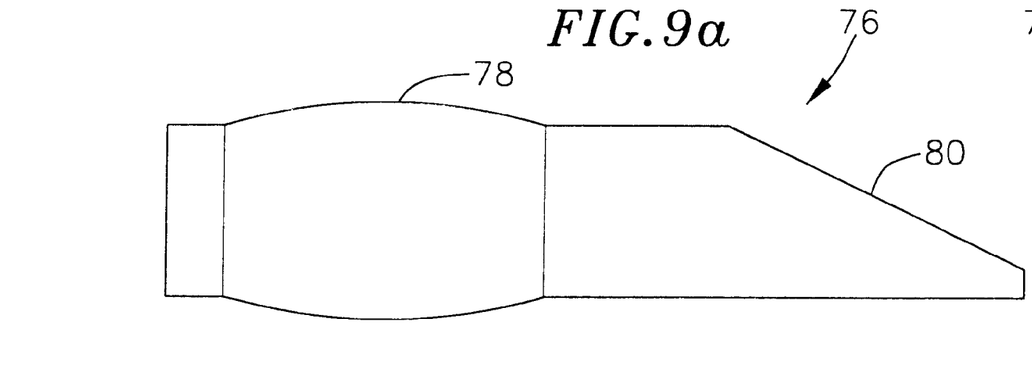
FIG. 9a is a side view of an embodiment of a bearing plug according to principles of the present invention.
Figure 9B:
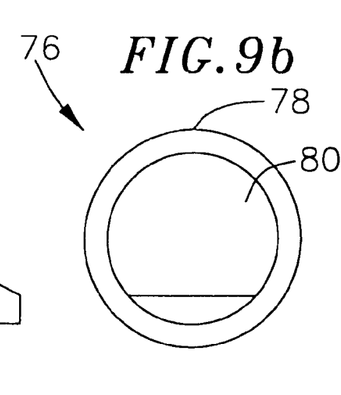
Figure 9C:
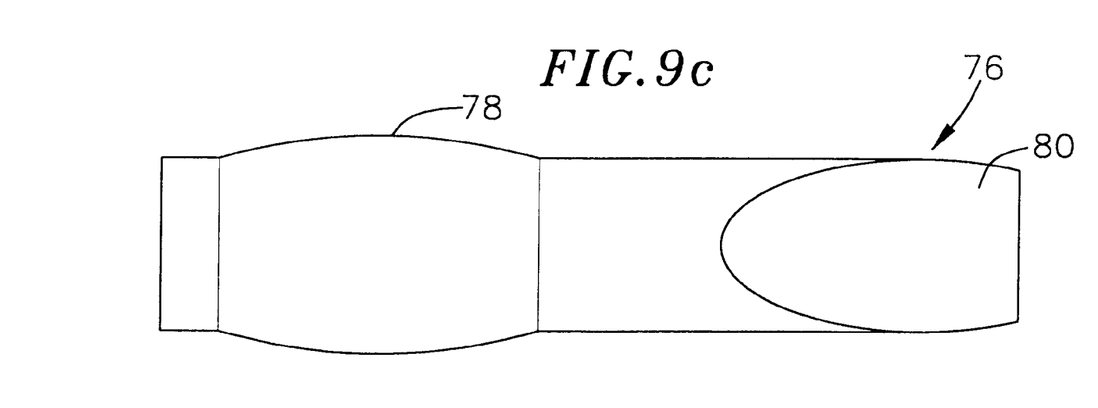
FIG. 9c is a side view of the bearing plug of FIG. 9a shown rotated 90 degrees.

Referring now to FIGS. 9a through 9c, the plug 76, is configured for insertion into the bearing passageway 36 to prevent removal of the retention bearing 74 and particularly, the ball bearings 74" as illustrated in FIG. 8a. The plug 76 also prevents entry of contamination. The plug 76 includes an enlarged portion 78 and a flat distal end 80. The enlarged portion 78 provides for frictional contact with the bearing passageway 36 and prevents inadvertent removal of the plug 76. The flat distal end 80 is used to maintain the ball bearings 74" within the retention grooves 30 and 54 (FIG. 8a). When using a cord retention bearing 74" (FIG. 8b), the plug 76 may omitted entirely as illustrated. Alternatively, the plug 76 may be provided with a shorter length.

Referring now to FIG. 10, an alternative embodiment of a fluid swivel coupling device constructed in accordance with the principles of the present invention is shown. In this embodiment, like features to those of previous embodiments are designated by like reference numerals succeeded by the letter "A." The fluid swivel coupling device 10A includes a housing 12A having a cavity 20A for rotatably supporting a second swivel body portion 16A in a similar configuration to that described in the previous embodiment. However, in the instant embodiment, the cavity 20A includes an enlarged housing retention groove 30A. In addition, the opposing annular retention groove 54A on the second swivel body portion 16A is also enlarged. This configuration creates a wider annular spacing or slot between the opposing retention grooves 30A and 54A, which in turn allows for a retention bearing 74A having a larger annular width than the previously described embodiment.

In the exemplary embodiment, the retention bearing 74A is a conventional radial bearing having an inner race 82 and an opposing outer race 84 supporting a plurality of ball bearings 86. Preferably, the races 82 and 84 and the ball bearings 86 are an integral unit as is conventionally known and supplied. The retention bearing 74A is preferably made from a stainless steel such as a 316 stainless steel. Alternatively, the bearing may be constructed from other materials, such as titanium or other corrosion-resistant metals. Plastics may also be used. The metal races 82 and 84 reduce the direct wear on the opposing retention surfaces 30A and 54A and prolong the life of the swivel coupling device 10A. As illustrated, the opposing retention surfaces 30A and 54A form flat surfaces to retain the bearing 74A.

The retention bearing 74A may be press fit into either the housing retention groove 30A or the annular retention groove 54A. Preferably, the retention bearing 74A is press into the annular retention groove 30A within the housing 12A. As illustrated, the housing retention groove 30A and the opposing retention groove 54A are no longer semi-circular grooves, but actually flat surfaces for receiving the bearing.

An annular spacer 88 may optionally be pressed over the second swivel body portion 16A and up against the bearing 74A. When provided with a wear sleeve 66A, the annular spacer 88 may also be pressed over the wear sleeve 66A. The annular spacer prevents the rotating bearing 74A from contacting the stationary seal 58A. This prevents undesirable rotation of the seal 58A and potential premature wear.

The annular spacer 88 includes an outer edge 90 which contacts the inner race 86A and retains the retention bearing 74A within the annular retention groove 54A. The outer edge 90 of the spacer 88 may even act as a lower portion of the annular retention groove 54A. The outer edge 90 of the annular spacer 88 also extends into the annular seal groove 56A and physically prevents the annular seal 58A from moving out of the annular seal groove. This is particularly advantageous when operating at higher pressures which may tend to push the annular seal 58A into the retention bearing 74A.

Instead of the spacer 88, a gland or other mechanical features may be machined into the annular space between the seal 58A and the bearing 74A such that the spacer 88 may be omitted while retaining similar wear characteristics.

After installing the retention bearing 74A and the annular spacer 88, the second swivel body portion 16A is pressed into the cavity 20A. Alternatively, other methods and devices for installing the retention bearing 74A into the opposing retention grooves 30A and 54A may be used as will be known to those of skill in the art.

Figure 12:
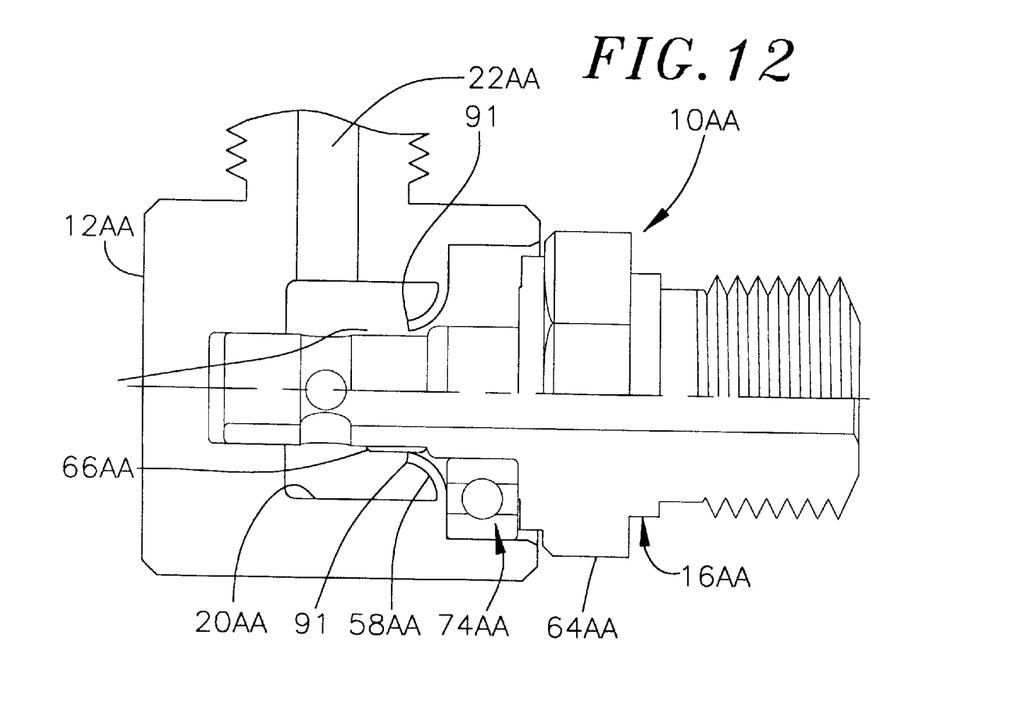
FIG. 12 is partial front, partial sectional view of another alternative embodiment of a fluid swivel coupling device constructed according to the principles of the present invention and showing an integrally formed annular lip seal.
Figure 13:
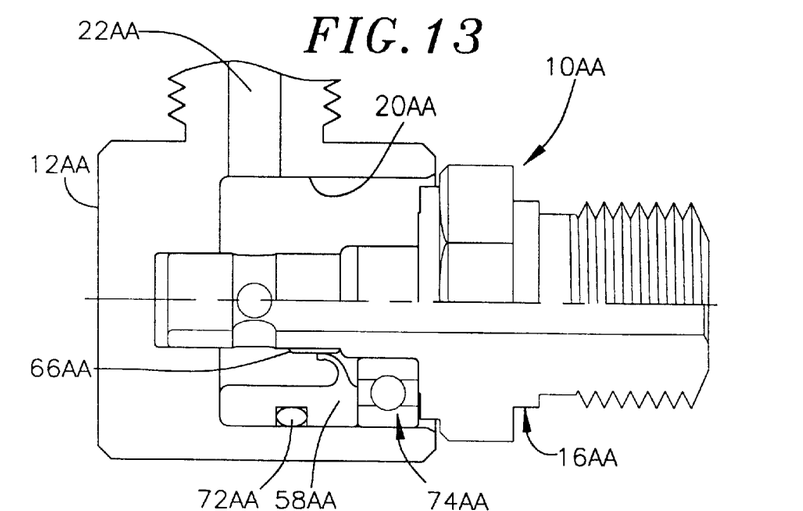
FIG. 13 is partial front, partial sectional view of another alternative embodiment of a fluid swivel coupling device constructed according to the principles of the present invention and showing a radial lip seal.

Referring now to FIGS. 11 through 13, another alternative embodiment of a fluid swivel coupling device constructed in accordance with the principles of the present invention is shown. In this embodiment, like features to those of previous embodiments are designated by like reference numerals succeeded by the letter "AA." The fluid swivel coupling device 10AA of each illustrated embodiment includes a housing 12AA having an internal cavity 20AA for rotatably supporting a second swivel body portion 16AA similar to the previously described embodiments.

In the exemplary embodiment illustrated in FIG. 11, the fluid swivel coupling device 10AA includes an alternative embodiment of an annular spacer 89 that is disposed within the internal cavity 20AA between the seal 58AA and the bearing 74AA. In this embodiment, the spacer 89 is a frictionless disc having an inner diameter slightly smaller than the inner diameter of the bearing 74AA and an outer diameter slightly greater than the outer diameter of the bearing. In this fashion, the spacer 89 reduces wear between the moving bearing 74AA and the seal 58AA and prevents unnecessary rotation of the seal. As previously noted, a gland or the like may be machined into the space between the seal 58AA and the bearing 74AA such that the spacer 89 may be omitted while retaining similar wear characteristics.

In the exemplary embodiment illustrated in FIG. 12, the fluid swivel coupling device 10AA includes a swivel housing 12AA having an integrally formed annular seal 58AA. In this embodiment, the swivel housing 12AA is preferably constructed from a polymer, such as a Teflon and is machined, molded or otherwise shaped to include an annular sealing lip 91. This configuration eliminates the need for a potentially contaminating energizer. In addition, the sealing lip can be formed so as to eliminate any need for a spacer between the seal 58AA and the bearing 74AA.

In the exemplary embodiment illustrated in FIG. 13, the fluid swivel coupling device 10AA includes a radial lip annular seal 58AA. As illustrated, this seal is a conventional type radial lip seal including a sealing energizer 72AA. In addition, a wear sleeve 66AA is provided about the second swivel body portion 16AA. However, as previously discussed, the sleeve 66AA may be omitted depending on the particular application. The bearing 74AA is disposed adjacent to the seal 58AA. However, as also previously noted, a frictionless spacer or gland may be provided to reduce wear between these moving component. In this embodiment, the seal 58AA may be advantageously replaced.

Referring now to FIGS. 14 and 15, another alternative embodiment of a fluid swivel coupling device constructed in accordance with the principles of the present invention is shown. In this embodiment, like features to those of previous embodiments are designated by like reference numerals succeeded by the letter "B." The fluid swivel coupling device 10B includes a housing 12B having a cavity 20B for rotatably supporting a second swivel body portion 16B similar to the previously described embodiments. However, in the instant embodiment, the inlet passageway 22B is parallel with the outlet passageway 48 to form a straight flow path and thus, a "straight" coupler.

In the exemplary embodiment specifically illustrated in FIG. 14, the fluid swivel coupling device 10B includes two annular seals 58B. To accommodate these two annular seals 58B, the opposing annular seal grooves 32B and 56B are lengthened along the first axis 24B. The use of two seals 58B is advantageous in high pressure applications and where long seal life is desired. In addition, use of two seals 58B provides a back-up seal in the event the first or exposed seal fails.

In the exemplary embodiment illustrated in FIG. 15, the fluid swivel coupling device 10B includes a single annular seal 58B and a spaced apart retention bearing 74B. As previously described, the annular seal 58B is spaced apart from the bearing 74B through use of a frictionless spacer 81B. It is to be understood that the seal 58B and the bearing 74B may also be spaced apart through use of a gland or other configuration as also previously described.

In the exemplary embodiments previously described and illustrated in FIGS. 1–15, the fluid enters the first or inlet passageway 22 in the housing 12 and exits through the second or outlet passageway 48 in the second swivel body portion 16. However, the direction of fluid flow may easily be reversed, thereby changing the inlet passageway 22 into an outlet passageway and the outlet passageway 48 into an inlet passageway. This reverse flow orientation allows the second swivel body portion 16 to act as the inlet passageway, and the housing 12 to act as the outlet passageway.

It will be understood that various modifications can be made to the present invention herein disclosed without departing from the spirit and scope thereof. For example, various types and combinations of housings and second swivel body portions are contemplated, as well as various types of construction materials. Also, various modifications may be made in the size, thickness, shape, diameters and configuration of the parts and their interaction. Therefore, the above description should not be construed as limiting the invention, but merely an exemplification of preferred embodiments thereof. Those of skill in the art will envision other modifications within the scope and spirit of the present invention as defined by the claims appended hereto.

We claim:

1. A fluid swivel coupling device for rotatably interconnecting fluid conduits of two coupling members together, the fluid swivel coupling device comprising:

a swivel housing comprising an internal cavity extending inwardly into the housing from an open housing end, and a fluid port extending from the housing and in fluid flow communication with the internal cavity;

a swivel body having a first end that is rotatably disposed within the housing internal cavity, the body first end comprising a fluid port that is in fluid flow communication with the housing fluid port;

an annular retention bearing disposed within the housing internal cavity and interposed between the housing and the swivel body to both permit rotatable movement of the swivel body within the housing and secure the swivel body axially within the housing internal cavity, the housing including a bearing passageway that extends through a wall portion of the housing from the internal cavity; and an annular seal disposed within the housing internal cavity and interposed between the housing and the swivel body, the annular seal comprising a jacket and an energizer and being positioned axially within the internal cavity between the annular retention being and the housing fluid port, the annular seal forming a substantially leak-tight seal against the swivel body;

wherein all elements of the device exposed to fluid contact are formed from a nonmetallic material.

2. The fluid swivel coupling device as recited in claim 1 wherein the annular retention bearing is interposed between grooves disposed along opposed housing and swivel body surfaces.

3. The fluid swivel coupling device as recited in claim 1 wherein the seal jacket is in the form of a radial lip seal for contacting the swivel body and forming a leak-tight seal between the housing internal cavity and the rotating swivel body.

4. The fluid swivel coupling device as recited in claim 2 further comprising a wear sleeve disposed along a surface of the swivel body and interposed between the swivel body and the housing internal cavity, the wear surface being formed from a material that is harder than that of the swivel body.

5. The fluid swivel coupling device as recited in claim 2 further comprising a non-metal frictionless annular spacer disposed within the housing internal cavity axially between the seal and the retention bearing.

6. A fluid swivel coupling device for rotatably interconnecting two fluid transfer members together, the fluid swivel coupling device comprising:

a swivel housing comprising a fluid port and an internal cavity in fluid flow communication therewith, the internal cavity having a cylindrical inner surface defining an annular housing retention groove and a spaced apart annular seal groove, the housing comprising a bearing passageway extending through the housing from the retention groove to an outer housing surface;

a swivel body rotatably disposed partially within the housing internal cavity, the swivel body including a fluid port that is in fluid flow communication with the housing fluid port, and having an annular retention groove disposed along a body surface positioned opposite from the housing retention groove;

an annular retention bearing interposed between the housing and body annular retention grooves to permit rotation of the body relative to the housing and maintain the second body secured axially within the internal cavity; and an annular seal disposed within the internal cavity and interposed between the housing and the swivel body to form a leak-tight seal between the internal cavity and the swivel body the seal comprising a jacket for making contact against a swivel body surface and an energizer to urge the jacket against the swivel body;

wherein the fluid swivel coupling device defines a nonmetal fluid passageway between the housing fluid port and the body fluid port.

7. The fluid swivel coupling device as recited in claim 6 wherein the housing, body, and the seal are all formed from a polymeric material.

8. The fluid swivel coupling device as recited in claim 6 wherein the retention bearing comprises a plurality of ball bearings.

9. The fluid swivel coupling device as recited in claim 6 wherein the ball bearings are formed from a ceramic material.

10. The fluid swivel coupling device as recited in claim 6 wherein the retention bearings are formed from a cord of a polymer material.

11. The fluid swivel coupling device as recited in claim 10 wherein the polymer cord comprises a nylon material having a melting temperature of less than approximately 350° F. and wherein the annular seal and the swivel body are formed from a polymer having a deformation temperature of greater than approximately 400° F.

12. The fluid swivel coupling device as recited in claim 6, and further comprising an annular wear sleeve disposed about a portion of the swivel body that is disposed within the internal cavity, the wear sleeve being formed from a material that is harder than that of the remaining swivel body, and the wear sleeve being positioned axially along the swivel body between the seal and a body fluid port open end.

13. The fluid swivel coupling device as recited in claim 12 wherein the wear sleeve comprises aluminum oxide.

14. The fluid swivel coupling device as recited in claim 12 wherein the wear sleeve comprises a material selected from the group consisting of sapphire, ruby, and zirconia.

15. The fluid swivel coupling device as recited in claim 11, and further comprising a frictionless annular disc disposed within the internal cavity between the annular seal and the retention bearing.

16. The fluid swivel coupling device as recited in claim 6 wherein the jacket is in the form of a rotary lip seal.

17. The fluid swivel coupling device as recited in claim 6 wherein the housing fluid port extends along a first axis, and the swivel body fluid port extends along an axis generally perpendicular to the first axis.

* * * * *

UNITED STATES PATENT AND TRADEMARK OFFICE
CERTIFICATE OF CORRECTION

PATENT NO.   : 6,086,112
DATED        : July 11, 2000
INVENTOR(S)  : Alan P. Schofield; John W. Kosty; Jon Maynard Lenhert It is certified that error appears in the above-identified patent and that said Letters Patent is hereby corrected as shown below:

Column 13,
Line 30, replace "retention being" with -- retention bearing --.

Column 14,
Line 33, replace "polymer material" with -- polymeric material --.

Signed and Sealed this

Fifth Day of March, 2002

Attest:

JAMES E. ROGAN
Attesting Officer       Director of the United States Patent and Trademark Office